T. M. MOORE.
PLOW.
No. 186,601.                    Patented Jan. 23, 1877.
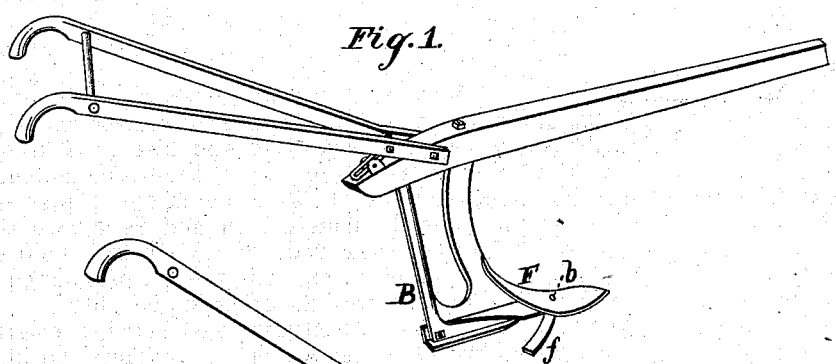
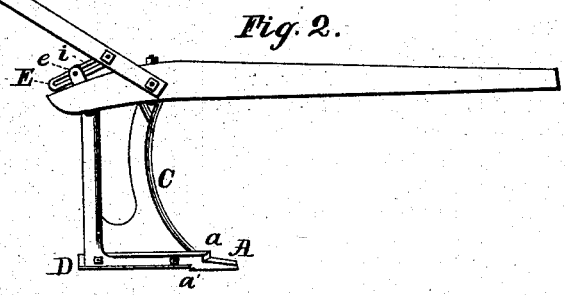
Witnesses:                      Inventor:

UNITED STATES PATENT OFFICE.

THOMAS M. MOORE, OF TYLER, TEXAS.

IMPROVEMENT IN PLOWS.

Specification forming part of Letters Patent No. 186,601, dated January 23, 1877; application filed June 16, 1876.

*To all whom it may concern:*

Be it known that I, THOMAS M. MOORE, of Tyler, Texas, have invented certain new and useful Improvements in Plows, of which the following is a full, clear, and exact description, reference being had to the accompanying drawings, making a part of this specification, in which—

Figure 1 is a perspective view of a plow with my improvements attached. Fig. 2 is a side elevation of the same. Fig. 3 is a bottom view of the foot.

My invention relates to plows; and consists of a detailed combination of elements, hereinafter described and claimed.

To enable others skilled in the art to make and use my invention, I will proceed to describe the exact manner in which I have carried it out.

In the drawings, A represents the foot of the plow, which is secured to the plow-beam by means of the brace B and standard C. The foot is constructed with a land-side, D, much broader at the bottom than is usual. The front or toe of the foot has two shoulders, $a$ $a$, to receive the points, shovels, and other plows with corresponding shoulders, and may be used with the various kinds of plows, subsoilers, shovels, wings, or sweeps. It may be used successfully as a turn plow or cultivator. The foot is so constructed that the plow bolted on it runs nearly, but not quite, level from the point to the bolt $b$, and then rises back so as to throw off the dirt.

The advantage of this is to lighten the draft by the point and forepart of the plow loosening the dirt, and the rear part throwing it out, and by this the plow brightens and cleans itself, and is better adapted to prairie-land.

There are two bolts, $d$ $d'$, on the foot to fasten on the plows, one in front of shoulder $a'$, and one in front of shoulder $a$. This enables the wing or turn-shovel to be fastened on, retaining the same point, and the sweep may also be fastened on and used with the shovel or scooter, or the sweep may be used with the point only, and the sweep is fastened separately from the other implements.

The plow being thus constructed, to change it from one implement to another, the handles must be raised or lowered, as may be required. To do this with facility, the handles are made adjustable by a movable brace, E, fastened between the handles by a bolt, $e$, through the handles, extending back with a long curved slot, $i$, through which passes another bolt fastened through a bent bar, one part of the bar being fastened to the beam behind the handles.

By this construction the handles may be raised or lowered, as required, and when adjusted are fastened firmly in place by tightening the tap.

Having thus described my invention, what I claim as new, and desire to secure by Letters Patent, is—

The combination of foot A, having standards B C and shoulders $a$, the curved blade $f$, the shovel F, fitting the curve of standard C, and clasping-blade $f$, and the securing-bolts $d$ $d$, as and for the purpose set forth.

T. M. MOORE.

Witnesses:
  W. S. HERNDON,
  SAWNIE ROBERTSON.